Alvin R. Bueneman
INVENTOR.

United States Patent Office 2,958,348
Patented Nov. 1, 1960

2,958,348

CIRCULAR SAW

Alvin R. Bueneman, Portland, Oreg., assignor to Irvington Machine Works, Inc., Portland, Oreg., a corporation of Oregon Filed Mar. 31, 1959, Ser. No. 803,253

2 Claims. (Cl. 143—139)

This invention relates to a saw construction, and more particularly to a disc or circular type saw which is rotated bodily by a suitable power means, and which has disposed about the perimeter thereof a novel cutting means for producing a cutting action in the saw.

Circular saws as a general class are old and well known. They are used extensively as crosscut saws, in gang-saw assemblies having a multiple number of such saws side by side, and in many other applications. The construction of this invention, while having utility in many such applications, is particularly advantageous when used in a gang-saw assembly where bodily detachment of the saw is a problem, or in an organization wherein for proper operation the diameter of the saw should remain substantially constant after successive sharpenings.

The conventional disc-type saw usually comprises a number of cutting teeth projecting radially of the saw which are integral with the body of the saw. The teeth are sharpened along their leading edges in a critical manner, and are given a critical set, so that during use and on rotation of the saw a rapid cut results and the kerf produced by the teeth easily accommodates the width of the saw without binding. While satisfactory in operation, the construction just described has a number of drawbacks, which include the requirement that considerable skill be used in sharpening the cutting teeth and in giving the requisite set to the teeth, and the fact that after every sharpening the overall diameter of the saw tends constantly to be decreased. Other disadvantages include the fact that the saw almost of necessity must be removed from the arbor which mounts it during sharpening. This is a complicated and tedious procedure, particularly in the case of gang saws. Further, the entire saw must be made of a high grade of steel which can retain its edge.

In general terms, this invention contemplates a circular saw which comprises a circular saw blade or mounting portion adapted to be mounted on the usual saw arbor and detachable teeth for this saw blade. The saw blade itself is devoid of any cutting teeth integral therewith. Instead, there is provided about the perimeter thereof an annular groove, which constitutes a seating means, and which is adapted to mount and to hold about the perimeter of the saw blade a detachable saw chain. Means are included for securing the saw chain in fixed position on the saw blade, and on rotation of the saw blade the entire assembly rotates as a unit.

The advantages of the construction described are that the cutters of the saw are easily sharpened without removal of the entire saw blade. Further, substantially no variation occurs in the overall dimension of the saw after continued sharpening, for it is an easy matter to substitute a new chain for an old one. A variability is given to the type of cut produced by the saw, through changing the type of saw chain used. A crosscut-type of saw can be prepared which is highly efficient and requires minimal amounts of power to run the saw.

The construction of the invention features an annular groove formed in the outer edge of the saw blade between opposite faces of the saw blade. The groove projects radially inwardly, substantially centrally of the saw blade faces. The saw chain that is mounted on the blade comprises a chain body made of the usual chain links, and projecting radially outwardly of the chain body plural cutters. Projecting radially inwardly from the chain body are anchoring portions which are adapted to seat within the annular groove already mentioned. The cutters are given a set so that at least a portion of the cutters project laterally to either side of the chain body and the faces of the saw blade. In this way, the kerf produced by the saw provides adequate clearance for the chain body and the saw blade.

The saw chain is held against lateral displacement relative to the blade by means disposed laterally inwardly of the blade faces. There is absent during operation any moving parts held laterally outwardly of the blade faces which might "hang up" on chips and retard movement of the blade through the wood. The groove itself is shielded from jamming with chips by the body of the saw chain. The outer faces of the saw blade provide a smooth guide surface as the saw progresses through a forming kerf. Manufacture of the saw blade is relatively inexpensive, since it is produceable using ordinary manufacturing techniques.

Other features and advantages of this invention will become apparent as the following description is read in conjunction with the accompanying drawings, wherein.

Figures 1, 2, 3, 4:
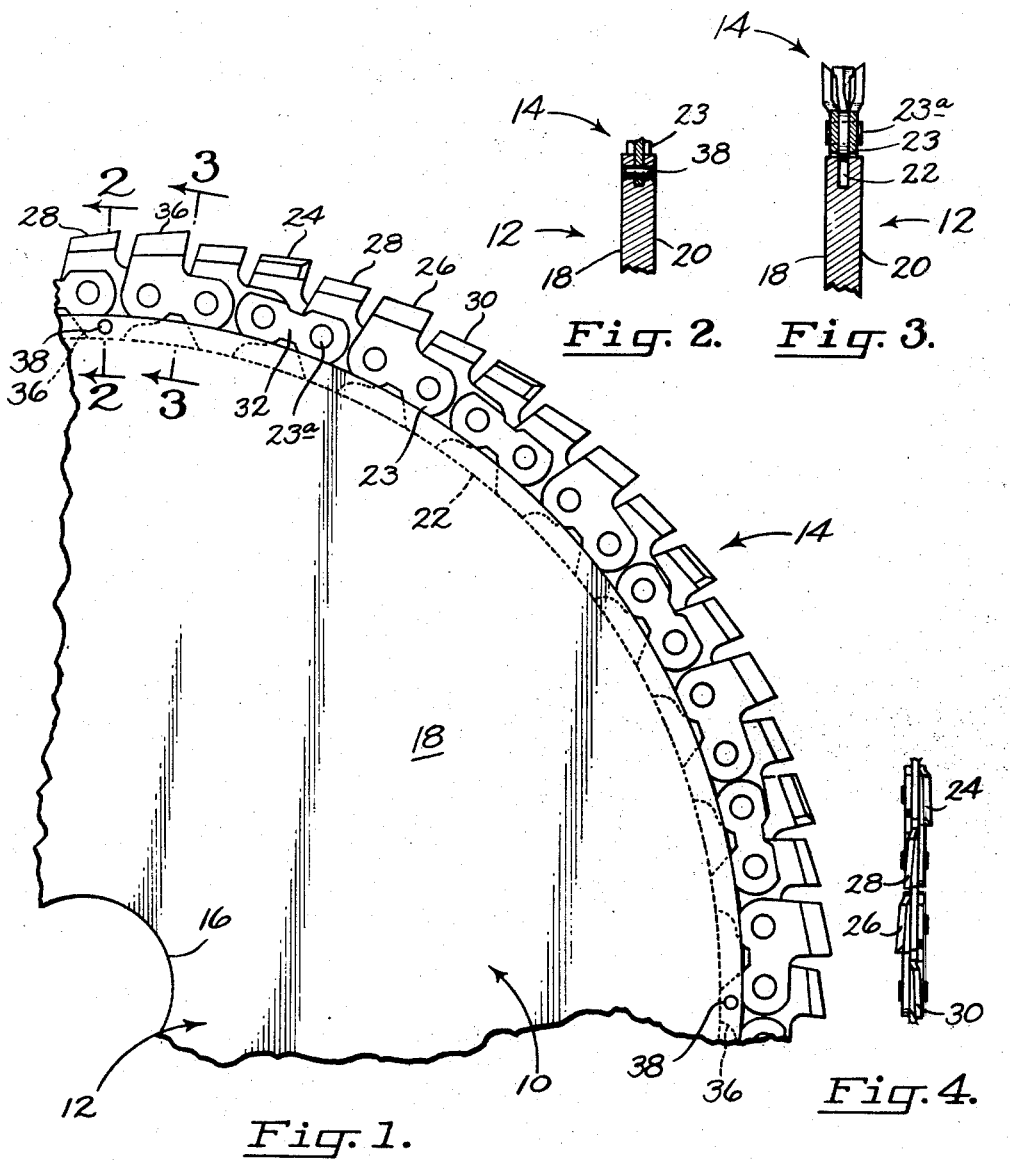
Fig. 1 is a side view of portions of a circular saw constructed according to an embodiment of the invention.
Fig. 2 is a section view along the line 2—2 of Fig. 1, showing a means for securing the saw chain to the saw-blade portion of the saw.
Fig. 3 is a section view along the line 3—3 of Fig. 1 illustrating the set which may be given to the various cutter teeth of the saw.
Fig. 4 is a view of a portion of the edge of the saw further showing the position of the various teeth in the saw according to one embodiment.

Referring now to the drawings, 10 indicates generally a circular saw constructed according to this invention. The saw comprises a saw-blade portion 12, and, extending about the periphery of the saw-blade portion, a chain-saw portion 14. Only a portion of the saw is illustrated in Fig. 1. The saw has a circular outline, and is secured to the usual powered saw arbor at 16 for rotation simultaneously with the saw arbor.

Concerning now details of the construction, saw blade 12 has smooth, opposed side faces 18, 20. Formed in the outer edge of the saw blade and extending the saw blade centrally between side faces 18 and 20 is an annular groove 22. This groove is employed as a seating portion for seating the saw chain 14 on the perimeter of the saw blade.

Saw chain 14 resembles some conventional crosscut types of saw chain. It comprises a body 23 made up of plural links joined by the usual pins 23a. Included in the saw chain are left-hand cutter links 24, right-hand cutter links 26, right-hand raker links 28 and left-hand raker links 30. These links have radially outwardly projecting cutter portions integral with the links. The raker links shown are not sharpened along their leading edges (the right-hand edges as viewed in Fig. 1), but the cutter links generally are so sharpened. Tie links 32 are included in the chain, where necessary, to hold the chain together.

When the saw is driven (and rotated in a clockwise direction in Fig. 1) the left-and-right-hand raker links function during cutting to rake out the bottom of the saw kerf. The left-and right-hand cutter links cut along the sides, and are given a set so that the cutting portions of these links extend laterally outwardly on either side of the saw beyond the plane of faces 18, 20. The body 23 of the saw chain has a width equal approximately to the width of saw blade 12. Thus, in operation, the kerf produced by the cutters gives sufficient clearance for the saw to enable the saw to move smoothly through the kerf without binding.

The saw chain is secured to the saw blade for rotation with the saw blade as a unit by inserting through depending anchor portions 36 of the raker links small connector pins 38. These pins 38 not only function to unite the two parts for simultaneous movement, but also act to hold the chain radially inwardly on the saw blade and to prevent it from being thrown outwardly under the urging of the centrifugal force which is generated during operation of the saw. In some instances, it may be desirable to pass the pins 38 through the depending portion of each raker link, however, in most instances it is only necessary to make the connection to the saw blade at regular angular modules about the saw rotation axis of about 90°. While the use of a large number of pins overcomes more effectively the action of centrifugal force, a large number of pins adds to the work required for separating the saw chain from the saw blade. The pins are held in place by friction.

By the construction described, a saw may be sharpened successively without the overall diameter of the saw changing materially. If the various cutter elements described become too short, the saw chain may be removed and replaced by a new one. To sharpen the saw, it is only necessary to remove the saw chain from the saw blade, and not the entire assembly. The construction permits ready changing of the type of saw cutters used. Some operations, for instance, may for best results require a saw with less cutter teeth than others, and such a change is easily made.

Of particular importance is the fact that the saw chain is locked both from rotary movement relative to the saw blade and also from radial movement outwardly of the saw blade. Further, it should be noted that lateral displacement in the saw chain is prevented by means disposed between the opposite faces of the saw blade. The only portions of the saw chain which project outwardly to either side of faces 18, 20 are the cutting portions of the left-and right-hand cutters. On moving through a saw kerf, there is nothing outwardly of faces 18 and 20 to hamper movement of the saw. Note also that the construction is substantially devoid of crevices or small openings which would tend to collect and to become jammed with chips.

It is claimed and desired to secure by Letters Patent:

1. A saw construction comprising a circular saw blade adapted to be secured to a power-driven saw arbor and be rotated thereby, a detachable saw chain extending about the perimeter of the saw blade, said saw chain having cutter elements projecting radially outwardly of the saw blade, and means mounting the chain on the blade and inhibiting radial and circumferential movement of the chain relative to the blade, said means comprising an annular groove formed in the edge of the saw blade about the perimeter of the saw blade and extending radially inwardly from the edge thereof, anchoring portions provided the saw chain projecting radially inwardly and disposed within said annular groove, and plural axially extending pins spaced at intervals about the perimeter of the saw blade and engaging said anchoring portions and the saw blade.

2. In a saw, the combination of a circular saw blade adapted to be secured to the power-driven saw arbor and be rotated thereby, a saw chain extending about the perimeter of the saw blade, said saw chain having cutters projecting radially outwardly of the perimeter of the saw blade, and means mounting the saw chain on the blade and inhibiting radial and circumferential movement of the chain on the blade, said means comprising annular shoulders provided the edge of the saw blade and spaced axially thereon, said shoulders defining an annular radially inwardly projecting groove extending about the perimeter of the saw blade and disposed substantially midway between opposite faces of the saw blade, said saw chain having a chain body supported on said shoulders of a width somewhat in excess of the width of said groove and not exceeding materially the width of said saw blade, radially inwardly projecting anchoring portions provided the saw chain seating in said annular groove, apertures in said anchoring portions spaced regularly about the perimeter of the saw blade and apertures in said shoulders registering with the apertures in said anchoring portions, and removable pins extending in an axial direction through registering sets of apertures having ends that are substantially flush with opposite faces of the saw blade, said cutters having a set whereby the saw kerf produced thereby has a width in excess of the width of the chain body and the saw blade.

References Cited in the file of this patent

UNITED STATES PATENTS

| 646,284 | Hilton | Mar. 27, 1900 |
| 2,857,942 | Mall | Oct. 28, 1958 |

FOREIGN PATENTS

| 569,379 | Germany | Feb. 2, 1933 |
| 932,037 | France | Nov. 17, 1947 |